May 9, 1933. W. R. GRISWOLD 1,907,794
MOTOR VEHICLE TRANSMISSION
Filed June 24, 1929
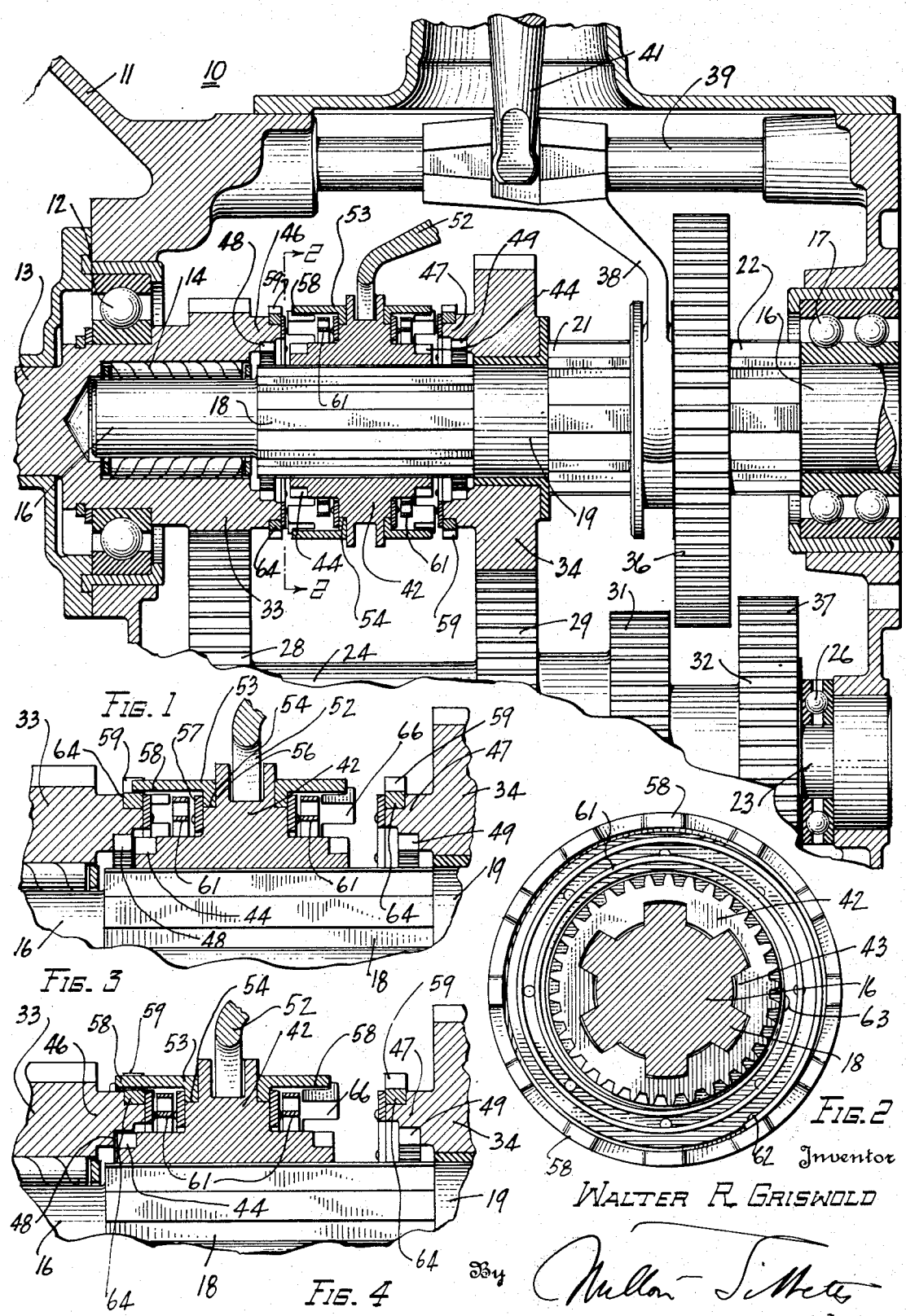

Patented May 9, 1933

1,907,794

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE TRANSMISSION

Application filed June 24, 1929. Serial No. 373,126.

This invention relates to motor vehicles, and more particularly to the transmission mechanism thereof, and it has for one of its objects to provide synchronizing means for the power transmission elements of such transmissions, whereby they are caused to approach the same speed before the establishment of a positive driving connection.

Another object of the invention is to provide a transmission having gear synchronizing means which shall be independent of friction brakes or slipping clutches or other non-positive synchronizing devices.

Another object of the invention is to provide a transmission mechanism having a synchronizing means in which the members to be synchronized shall be elastically coupled during the period of synchronization by means of a resilient torque-transmitting member.

Another object of the invention is to provide such a transmission synchronizing device in which the synchronizing means may be coupled between the power transmitting members substantially without shock or noise.

A further object of the invention is to provide such a device in which relative rotary movement of the transmission members shall produce a proportionate distortion of the resilient synchronizing member, which shall resist such movement in like proportion, there being a continual interchange of energy between the transmission members and the resilient member until an equilibrium is established.

Other objects of the invention will appear from the following description taken in connection with the drawing, which forms a part of this specification, and in which:

Figure 1 is a view, partially in elevation and partially in longitudinal section, showing a motor vehicle transmission embodying this invention;

Figure 2 is a section taken substantially on the line 2—2 of Figure 1, and

Figures 3 and 4 are detailed sectional views showing successive positions of parts of the device in the process of shifting the transmission gear from neutral to high speed.

Referring to the drawing, at 10 in Figure 1 is shown generally a transmission or change speed mechanism adapted to transmit power from the engine of a motor vehicle to the drive or propeller shaft thereof, having the usual closed case or housing 11, adapted to enclose the change speed gearing and to contain lubricant therefor. In the front wall of the housing 11 is mounted a bearing 12, of any suitable construction, but preferably of the annular type adapted to receive axial thrust, in which is journaled the rear end of a drive shaft 13, which may be the vehicle clutch shaft and which projects through the wall into the housing. The rear end of this shaft 13 is provided with a recess for a bearing 14, in which is journaled the forward end of a driven or transmission shaft 16. The rear end of the shaft 16 is journaled in a bearing 17, preferably also of the thrust receiving type, mounted in the rear wall of the housing 11. This shaft 16 is coaxial with the shaft 13 and projects through the rear housing wall, where it may terminate in a universal joint or be otherwise connected to drive the vehicle propeller shaft (not shown) in the well known manner.

The forward end of shaft 16, adjacent the portion journaled in the bearing 14, is provided with splines 18, and adjacent this splined portion is a plain cylindrical portion 19 terminating in a shoulder 21. Rearwardly of this shoulder the shaft 16 is of somewhat larger diameter and is provided with splines 22.

Below and to one side of the shaft 16, and parallel thereto, an arbor 23 is rigidly mounted in the housing 11, on which is rotatably mounted a gear spool or gear cluster 24, which is spaced from the front and rear housing walls by thrust bearings such as 26, and which constitutes the transmission countershaft. This countershaft cluster includes a constant mesh gear 28, a second speed gear 29, a first or low speed gear 31, and a reverse gear 32, which are preferably of the usual spur tooth form. The gears 28 and 29 are in constant mesh respectively with a pinion 33 formed on the end of the clutch shaft 13, and with a gear 34 which is journaled to rotate on the cylindrical shaft portion 19 and is spaced thereon by the shoulder 21.

The first speed gear 31 is adapted to mesh with a spur toothed gear 36 slidably mounted on the splines 22, this gear 36 also being shiftable so as to be driven from the reverse gear 32 through an intermediate reverse gear 37, independently mounted in the housing in the usual manner.

Hence it will be understood that the countershaft 24 is continuously driven through the constant mesh gear train 33—28, as in the conventional transmission, and that low speed forward, or reverse, may be obtained by moving the gear 36 on the splines 22 to mesh either with the gear 31 or with the gear 37. Such sliding movement of gear 36 is effected in the well known way through a shifter fork 38 carried by a slidably mounted shifter rod 39, and actuated by a shifter lever 41.

It will also be noted that the second speed gear 34 is continuously rotated by the gear 29 on its bearing 19 on the shaft 16. To secure second speed, and high speed or direct drive of the transmission shaft 16, means is provided whereby either the gear 34 or the pinion 33 may be clutched to the shaft 16, depending on the speed desired. To this end a clutch member or block 42 is mounted on the shaft 16 between the gears 33 and 34, and is adapted to drive this shaft through the splines 18, being provided for this purpose with internal splines 43.

The gears 33 and 34 have axially disposed annular projections 46 and 47, which are provided with internal teeth 48 and 49, and the block member 42 is provided at both ends with teeth 44, similar in size and in pitch to the internal teeth described. The clutch member 42 is slidably mounted on the splines 18 and may be moved forwardly or rearwardly to selectively engage either the teeth 48 or the teeth 49. Such sliding movement of the member 42 is effected by a shifter fork 52, similar to the fork 38, and connected to a shifter rod similar to rod 39, and operable by the lever 41. It will be readily understood that this device constitutes a toothed clutch whereby the teeth 44 may be moved to engage the teeth 48 or 49, thereby connecting gear 33 and member 42 to provide a direct drive, or to engage teeth 44 and 49 thereby connecting gear 34 and member 42 to provide a second or reduced speed drive through the gear trains 33—28 and 29—34.

Engagement of the teeth 44 with teeth 48 or teeth 49 can be effected without clash or shock only when the parts provided with the teeth are rotating at the same or substantially the same speed, which condition seldom obtains in practical vehicle operation. Usually, upon disconnection from the engine, the clutch shaft 13 spins, over-running the transmission shaft 16 so that the vehicle operator must wait for it to slow down to the proper speed before he can shift his gears, and he must guess when that proper speed obtains. For this reason the operation of shifting gears is a delicate one, requiring considerable skill as is well known. To permit rapid and accurate gear changing without noise or damage to the toothed elements, this invention provides a synchronizing device adapted to bring the parts to be connected to substantially the same speed prior to the engagement of clutch teeth. To this end, a synchronizing device is located between the block member 42 and each of the gears 33 and 34. As these devices are identical in construction, it is only necessary to describe one of them.

As illustrated, the synchronizing device comprises an annular clutch member 53, rotatably mounted on the member 42, being journaled for this purpose on a bearing 54 thereon, and positioned between an adjacent shoulder 56 and a removable retaining member 57. The clutch member 53 is provided with an axially disposed extension on which clutch teeth 58 are formed, these teeth being adapted to engage co-operating clutch teeth 59 carried on the gear extension 46. These teeth are of such length that if the clutch block 42 is moved axially toward the gear 33, the teeth 58 will engage with the teeth 59 before the teeth 44 engage with the teeth 48. This clutch member 53 is connected with the block 42 by resilient means adapted to store energy, preferably a spiral torsion spring 61. This spring is secured at its outer end to the inner face of the annular member 53, as shown at 62 in Figure 2, and at its inner end to the slidable block 42 as indicated at 63. It will be evident that upon engagement of the synchronizer teeth 58 and 59, any relative movement between the gear 33 and the block 42 will tend to distort the spring 61, either winding it up or unwinding it according to the direction of the relative movement, and thus transmitting torque between these members. Elastic energy is thus stored in the spring, and its reaction is exerted on the member having the lesser inertia, in this case the clutch shaft, tending to bring this member to synchronous speed with the member of greater inertia. Such distortion of the spring will continue until the energy stored therein is equal to the difference between the ballistic energy of the gear and the ballistic energy of the block, at which time the speeds of these elements will be substantially equal. Further axial movement of the block 42 will now bring the teeth 44 into mesh with the teeth 48 thus positively connecting the transmission in direct drive in the well known manner.

The operation of the device may be better understood from an example. Assuming that the operator has just shifted out of second gear so that the vehicle is coasting with the gears in neutral position as shown in Figure 1, the shaft 13 being disconnected from the engine by disengagement of the vehicle clutch in the usual way (not shown). In this position, the transmission shaft 16 and the clutch block 42 are rotating clockwise as viewed from the front end, at a speed determined by the speed at which the vehicle is moving, while the clutch shaft 13 with its teeth 48 is rotating in the same direction but at some different speed determined by the inertia of the shaft and the associated vehicle clutch elements. Usually the clutch shaft 13 will spin and over-run the shaft 16. Assuming that this is the case, the initial axial movement of the clutch block 42 toward the gear 33 will bring the clutch teeth 58 into engagement with the co-operating clutch teeth 59, thus connecting the spinning clutch shaft to the block 42 through the spiral spring 61. As the synchronizer member 53 is relatively light, and as the initial resistance of the spring 61 is low, the engagement of teeth 58 with teeth 59 may be readily effected without appreciable shock or noise. The effect of such engagement is to wind up the spring 61, at the same time removing energy from the spinning clutch shaft and its associated parts, and thus rapidly reducing the speed of the latter. This interchange of energy will take place until the clutch shaft has been brought to a speed substantially the same as the speed of the block 42, at which point a balance is effected between the energy of the clutch shaft and the energy stored in the spring. By a further movement of the lever 41, the block 42 is now moved axially to effect engagement between the teeth 44 and 48, so that the clutch shaft is positively connected to the transmission shaft 16, and the transmission is in high gear.

A similar action takes place upon shifting from neutral position to connect the clutch block 42 to the second speed gear 34 through the teeth 44 and 49, as will be readily understood. In practice, the interchange of energy between the over-running transmission member and the spring 61 is relatively rapid, and with a spring 61 of suitable stiffness, synchronization of these elements may be effected within a very few revolutions of the driven shaft 16.

It will be apparent that should the vehicle operator, through ignorance or inadvertence, attempt to shift the block 42 into engagement with either of its co-operating gears, without first disengaging the main vehicle clutch, the power of the vehicle engine will be directly exerted to distort the spring 61. As the engine torque is considerably greater than the torque involved in the normal synchronizing operation, this manœuvre would probably result in breaking the spring 61. To prevent this, the clutch teeth 59 are preferably mounted on the gear extension by means of an over-load device, which may be of any suitable construction but which is illustrated as a ring 64 having a frictional engagement with the gear extension 46. Under normal synchronizing conditions the friction between the ring 64 and its support is ample to transmit the torque between the teeth 58 and 59 without slipping. However, upon the imposition of an over-load of the character designated, the ring 64 will slip on its mounting before the ultimate strength of the spring 61 is reached, thus preventing damage to said spring.

To insure prompt engagement of the co-operating clutch teeth 58 and 59 upon initial shifting movement of the block 42, some of the teeth on the annular member 53 may be made longer than the others, as best illustrated in Figures 3 and 4, from which it will be seen that every third tooth 66 is somewhat longer than the intervening teeth 58. It is evident that this arrangement will greatly expedite engagement of the clutch teeth should the ends of the teeth 66 abut the ends of the teeth 59 at the beginning of the shifting movement, the effect being the same as providing a coarser pitch for these teeth. At the same time, sufficient teeth are provided to safely carry the load to be transmitted through the spring 61.

From the foregoing description, it will be apparent that this invention provides simple, reliable, and efficient means for synchronizing the relatively rotatable elements of a transmission, which does not in any way depend upon variable friction values, but which is positive, quiet in operation, and inexpensive to build and maintain.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. The combination with a motor vehicle transmission having relatively rotatable members and toothed means engageable to positively connect said members, of a resilient member connected to one of said rotatable members, and means frictionally associated with the other member adapted to clutch with said resilient member prior to engagement of said toothed means.

2. The combination with a motor vehicle transmission having relatively rotatable members including toothed means adapted to be moved into engagement to positively connect said members, of a spiral spring connected at one end to one of said members, clutch means connected to the other end of said spring, and co-operating clutch means carried by the other member adapted to connect said spring between said members prior to engagement of said toothed means.

3. The combination with transmission gearing having relatively rotatable toothed members one of which is slidably mounted for intermeshing engagement with the other, of a clutch member rotatably mounted on the slidable member, and a co-operating clutch member carried by the other toothed member and adapted to engage the other clutch member before intermeshing of the toothed members, and a spiral torsion spring connected at one end to the slidable toothed member and at the other end to the rotatable clutch member.

4. The combination with transmission gearing having relatively rotatable toothed members one of which is slidably mounted for intermeshing engagement with the other, of a synchronizing device between said members including clutch members on the respective toothed members and adapted for engagement prior to engagement of said toothed members, a torsion spring connecting one of the clutch members to one of the toothed members, and a yieldable connection between the other clutch member and the other toothed member operable upon an over-load upon said spring.

5. The combination with a transmission gearing having relatively rotatable members having means movable into positive driving relation, of an elastically deformable member adapted to transmit torque between said members, and means to yieldably connect said deformable member between said rotatable members prior to positive connection there-between.

6. In a transmission having relatively rotatable toothed members adapted for intermeshing engagement, a synchronizing device comprising, clutch members carried by the toothed members and movable thereon, and a torsion spring connected between one of the toothed members and the associated clutch member.

7. The combination with a motor vehicle transmission having relatively rotatable members and toothed means engageable to positively connect said members, of a clutch member resiliently connected to one of said rotatable members, and a clutch member frictionally associated with the other of said rotatable members, said clutch members being engageable prior to engagement of the toothed means.

8. In a transmission having relatively rotatable toothed members adapted for intermeshing engagement and a shiftable positive clutch element for connecting said toothed members, a synchronizing device engageable between said members prior to the formation of a positive drive between them comprising positive driving means frictionally engaged with one of said members, a ring freely rotatable on the positive clutch element, and a spiral spring resiliently connecting said ring to said positive clutch element, said ring having an over-hanging toothed projection engageable with said positive driving means upon initial movement of the positive clutch element, and spaced from the positive clutch element to form therewith a recess for the spiral spring.

In testimony whereof I affix my signature.

WALTER R. GRISWOLD.